United States Patent

[11] 3,604,524

| [72] | Inventor | Campbell Dean Boadle<br>Pentwyn, Ponthir Rd., Caerleon,<br>Monmouthshire, Wales |
|---|---|---|
| [21] | Appl. No. | 810,918 |
| [22] | Filed | Mar. 24, 1969 |
| [45] | Patented | Sept. 14, 1971 |
| [32] | Priority | Dec. 7, 1965 |
| [33] | | Great Britain |
| [31] | | 51926/65<br>Continuation of application Ser. No.<br>599,869, Dec. 7, 1966, now abandoned. |

[54] ELECTRICAL WEIGHING APPARATUS OF THE POTENTIOMETRIC BALANCE TYPE
4 Claims, 3 Drawing Figs.

[52] U.S. Cl. ..................................................... 177/70, 177/210
[51] Int. Cl. ...................................................... G01g 19/22
[50] Field of Search ........................................... 177/70, 122, 123, 210, 212

[56] References Cited
UNITED STATES PATENTS

| 3,127,947 | 4/1964 | Vogel ........................... | 177/70 |
| 3,030,569 | 4/1962 | Chilton ........................ | 177/210 UX |
| 3,076,515 | 2/1963 | Chilton ........................ | 177/210 X |
| 3,104,727 | 9/1963 | Chilton ........................ | 177/210 X |
| 3,204,711 | 9/1965 | Boadle et al. ................ | 177/210 X |
| 3,247,915 | 4/1966 | Chilton ........................ | 177/210 X |
| 3,254,728 | 6/1966 | Aquadro et al. .............. | 177/210 X |
| 3,259,199 | 7/1966 | Noble et al. .................. | 177/210 X |

*Primary Examiner*—Richard B. Wilkinson
*Assistant Examiner*—George H. Miller, Jr.
*Attorney*—Dowell & Dowell ABSTRACT: A weighing apparatus of the potentiometric balance type comprising a weighing container, one or more electrical transducers arranged beneath the container, a self-balancing potentiometer for measuring the output signal of the transducers, a servomotor driving potentiometer shaft and energized by a difference signal produced by the transducers and the potentiometer and representative of the weight on the said container, control and indicating means driven by the said servomotor, means for disconnecting the indicating and control means from the servomotor, and means for automatically returning the control and indicating means to zero after the said disconnection has taken place.

Fig. 3.

ELECTRICAL WEIGHING APPARATUS OF THE POTENTIOMETRIC BALANCE TYPE

This application is a streamlined continuation of application Ser. No. 599,869, filed Dec. 7, 1966 and now abandoned.

This invention relates to electrical weighers of the potentiometric balance type, that is to say, to weighers of the kind in which an electrical signal is generated by one or more electrical transducers which support the weigher platform or container, and which in turn is measured precisely by means of a self balancing potentiometer driven by a servo motor energized by an amplified difference signal derived from the difference between the signal produced by the transducer and that provided by the potentiometer, the potentiometer shaft being coupled mechanically to an indicating and/or control mechanism so that its rotation is used to operate an indicator or a control device, or both.

According to the present invention means are provided for uncoupling the drive from the potentiometer shaft to the indicating or control mechanism and for setting the said indicating or control mechanism to zero.

This allows the electrical balance system to be at balance at the zero point of the indicating or control system. Thus for example, if the invention is employed when an empty container is placed on the weighing platform, it will allow the electrical balance system to come to balance before coupling to it the indicating or control system which has been set to zero.

Although the invention has application elsewhere, it is particularly suitable for use in electrical weighing machines of the dispensing type in which the flow of material into a container is controlled and the flow is interrupted when the weight of material added has reached a predetermined value. In such apparatus it is possible, by having a number of sources of different material and operating a succession of such controls, one for each material, to construct a weigher which will automatically weigh off a batch of mixed materials, compounded according to a predetermined recipe.

These dispensing weighers usually have the weight-setting controls for each material in the form of cumulative weights; that is to say, the weight of the first ingredient to be added is set up as its true weight; the weight of the second ingredient as the weight of the first plus the second and that of the third, the weight of the first plus the second and the third, and so on. This system, while simplifying the weigher design, has a number of disadvantages. It requires careful arithmetic computation of the successive cumulative weights; once set up it is not possible to check the recipe directly from the weight settings and any change which may be required to any of the ingredient weights except the last, requires changes to every subsequent ingredient weight. Also in operation, should an accidental overweight of any ingredient be made, due to a delay in the material feeder stopping the flow of material, then this amount of overweight will reduce the amount of the next ingredient, and this may seriously alter the balance of a recipe. All these disadvantages seriously effect the utility of these weighers.

The present invention provides means for overcoming these disadvantages as well as providing an automatic adjustment of machine zero before weighing starts since these are clearly situations which occur in batch weighing which are comparable to those which obtain at the beginning of the weighting operation.

By means of the invention the tar weight of an empty container may be allowed for, and differences in the weight, etc., of successive containers in a batch weigher then become of no significance. Equally variations in the weight of a fixed container, due to incomplete discharge of materials, or build up of dust etc., may be automatically allowed for before weighing of the next batch of materials.

The invention will now be further described by way of example and with reference to the accompanying drawings in which:

FIG. 3 is a view in the direction of arrows AA in FIG. 2.

Figure 1:
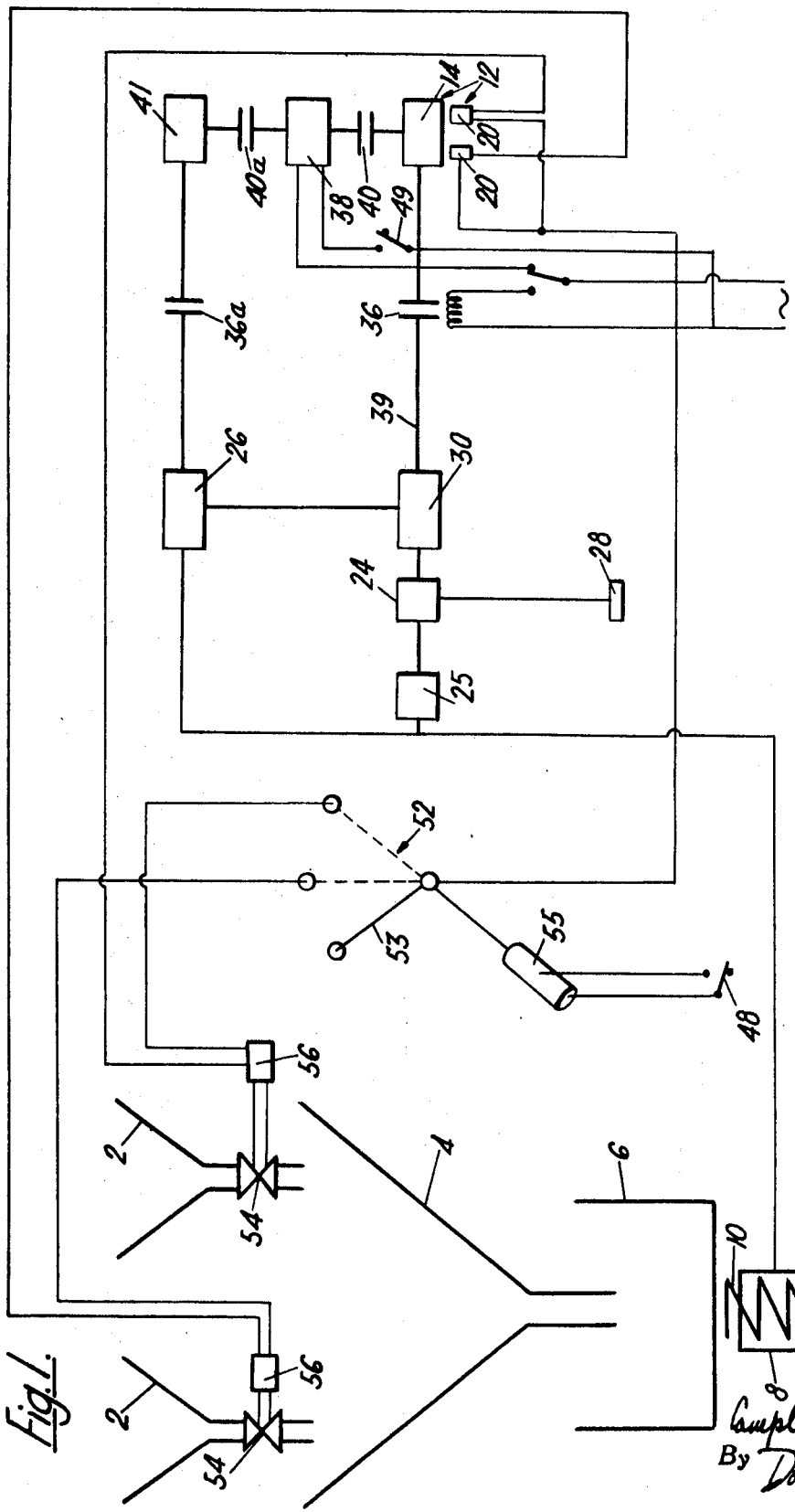
FIG. 1 is a diagrammatic arrangement of a batch weighing apparatus embodying the invention.

Referring to the drawings the batch weigher comprises two controlled feeders 2 both of which discharge into a common feeder channel 4 from which the dispensed material is discharged into a weighing container 6. The weighing container is supported on a transducer arrangement 8 which is usually in the form of a stiff spring 10 to which is bonded in selected places electrical strain gauges. The arrangement is such that a signal can be obtained from the transducer representative of the load in the weighing container 6.

Figure 3:
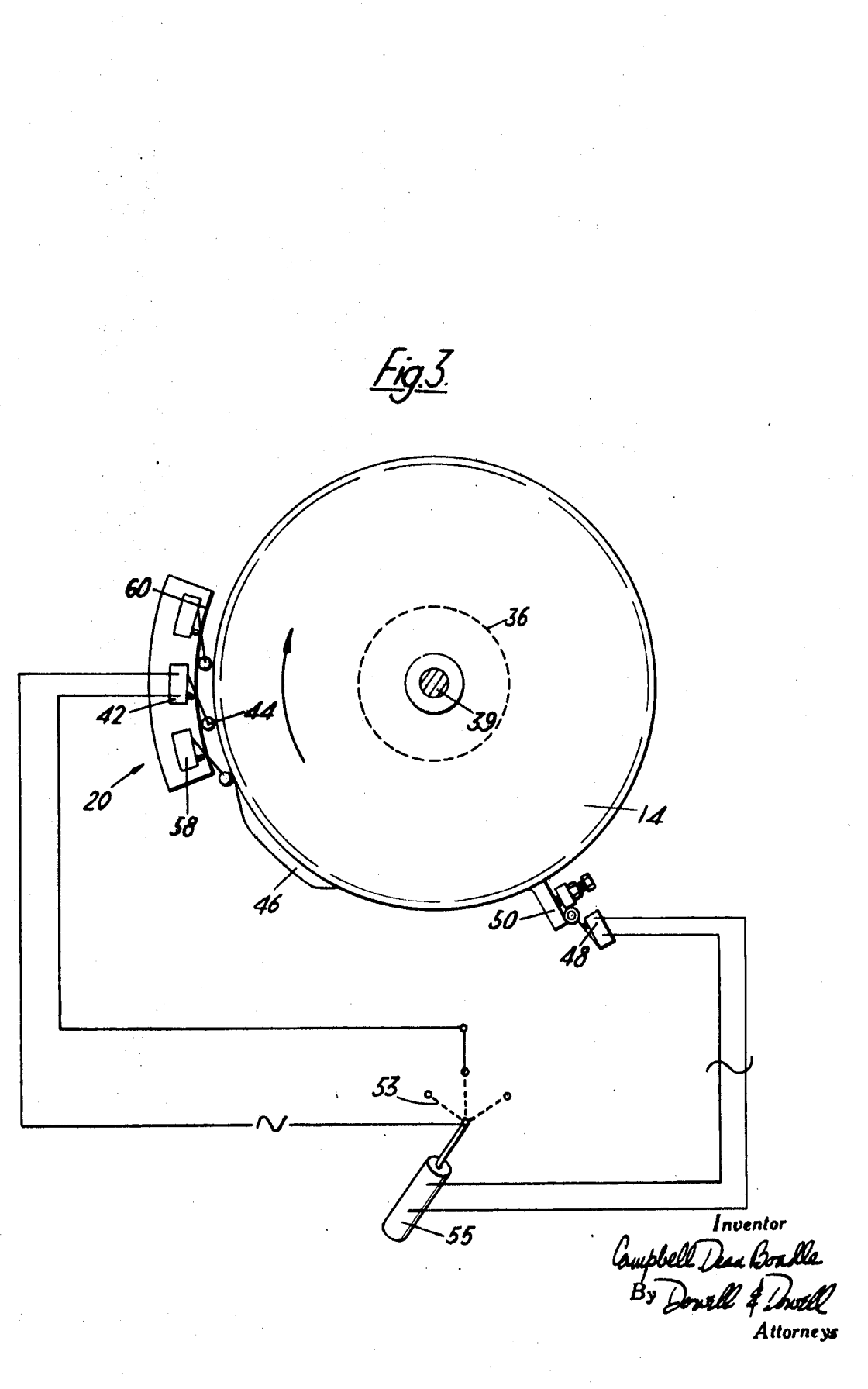

A trip mechanism generally indicated by reference 12 and described in more detail with reference to FIG. 3 is provided for tripping the feed of successive materials to the weighing container, this mechanism incorporating a series or bank 14 of cams mounted on a common shaft 16, and driven from a servosystem 18 so that they complete rather less than one revolution for the complete load range. There is one cam for each feeder 2 trips 20 to be described in more detail later in connection with FIG. 3, one for each cam in the bank are adjustable in position around each cam, the relative locations of the trips representing a desired weight. The trips may be adjusted by means of, for example, a shaft and dial (not shown) mounted on a control panel of the weigher apparatus. These trips are set to the weight of each ingredient to be weighed and are located in the circuits of electrically actuated means 56 which control shutters or the like 54 controlling feed from feeder 2 to channel 4. The trips may be microswitches, magnetically operated read switches, photoelectric devices or other devices capable of reliably and consistently interrupting or actuating an electrical circuit at the trip point.

All the cams are driven by the same servomotor 24 which drives a self-balancing potentiometer 26. The servomotor 24 which is of the two-phase type, is powered on one phase by mains supply from source 28 and the other phase by a difference signal obtained from the transducer signal and a signal in opposition produced by the potentiometer, the signal being amplified by a power amplifier 25.

Figure 2:
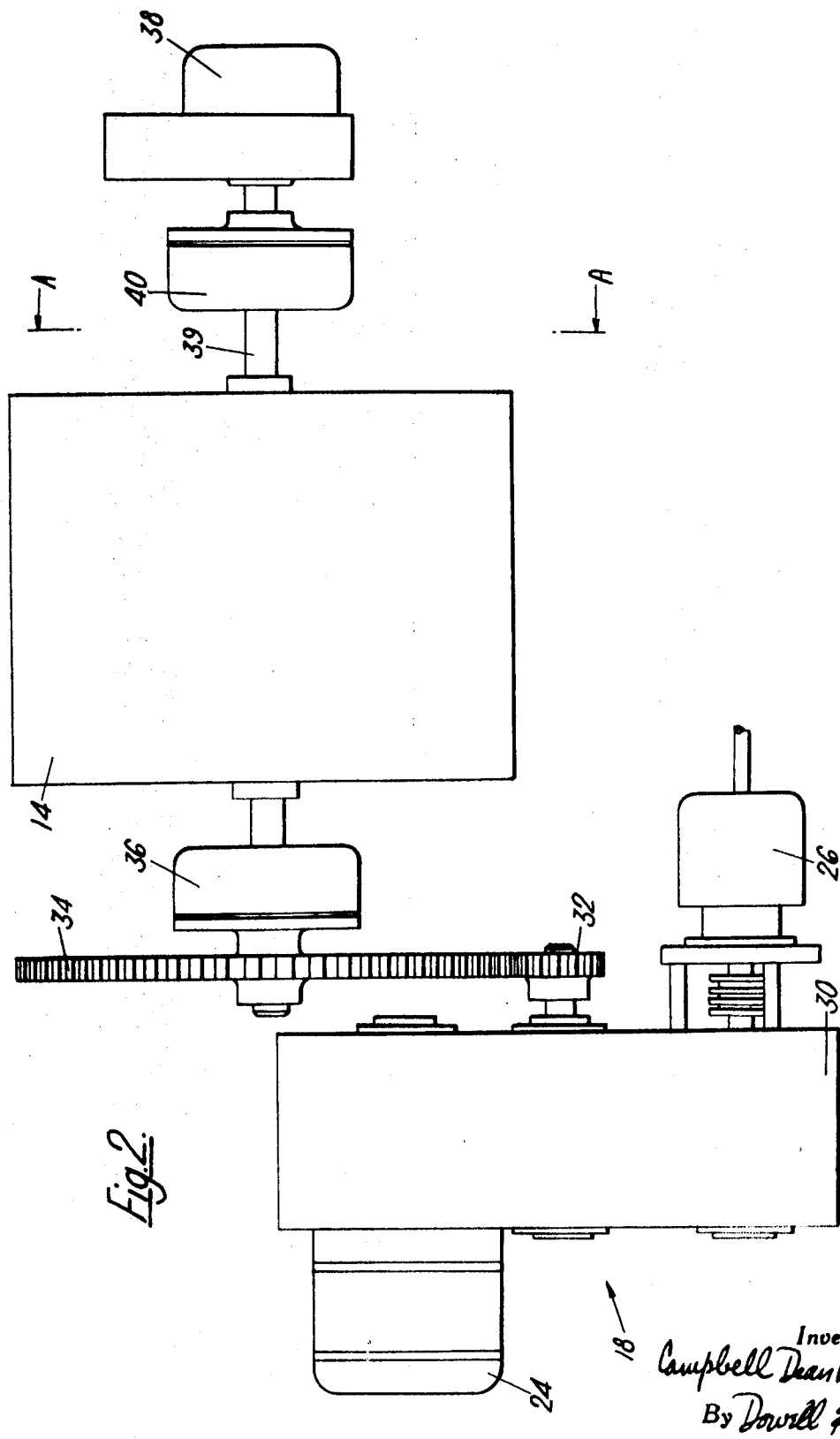
FIG. 2 shows details of the control apparatus used in the arrangement shown in FIG. 1.

The servounit 18 is shown in FIG. 2, in which the servomotor 24 drives the potentiometer 26 and cam bank 14 through a gearbox 30. Drive to the cam bank is transmitted from this gearbox via spur gears 32, 34 and a magnetic clutch 36. A reset motor 38 is connected to the cam bank shaft 39. A magnetic clutch 40 is between this reset motor 38 and the cam bank if desired, the arrangement being such that when clutch 36 is energized and so driving the clutch 40 is deenergized and vice versa. Further magnetic clutches 36a and 40a are provided between the potentiometer 26 and reset motor 38 and an indicator 41 is positioned between the two clutches 36a and 40a.

A stepping switch 52 is arranged in the circuits of the electrically actuated means 56 each location of the arm 53 of the switch corresponding to a particular one of the feeders 2. Thus according to the position of the arm 53 a selected feeder can be arranged to supply material to the feed channel 4. Arm 53 is stepped by motor 55 connected in circuit with switch 48 (FIG. 3) as will be explained in more detail later.

Thus the trip mechanism 12 is coupled to the indicating mechanism associated with the potentiometer 26, and is uncoupled from the servomotor 26 drive by the same device which uncouples the indicator. The reset motor drive is used to reset both the indicator and cams to zero, while the potentiometer system is at balance: and this may be at any point in the load range.

Referring to FIG. 3 which shows the trips 20 in more detail, a trip switch 42 having a cam follower 44 to actuate it is set at the required location depending on the weight of material required and is actuated by movement past the follower of the hump 46 on the cam during rotation of the cam by the servomotor. A switch 48 in the reset motor circuit is located adjacent the cams bank and is arranged to be actuated by a projection 50 on each cam when the cam returns to a zero point so as to cut out the reset motor drive.

In operation, the system functions as follows:

The weigher is switched on, and the weighing container 6 is empty and the cams not in the zero position. On pressing a start button, i.e., moving switch 53 to the position shown in FIG. 1 the connection between the potentiometer drive and the cam system is broken by deenergizing magnetic clutch 36 on shaft 39 and energizing the resetting motor 38 for the cams. The resetting motor 38 thus drives the camshaft back to the zero stop 49 (FIG. 3), whereby means of projection 50 switch 48 is actuated, reenergizing the magnetic clutch 36, and deenergizing the reset motor 38.

At this point the motor 55 of stepping switch 52 is energized by the closing of switch 48 and advances one step to energize the trip circuits 20 associated with the first set of cams in the bank. As the device 56 is in this circuit the shutter or the like 54 is opened to start the first feeder supplying the first ingredient to the weigh hopper. During this time the cam bank is rotated in a clockwise direction (as shown in FIG. 3) by servomotor 34 until hump 46 engages follower 44 thereby causing switch 42 to be opened. The feeder power circuit is thus broken, stopping the feeder. After a short delay imposed by a delay timer (not shown), the magnetic clutch 36 is again deenergized and the reset motor 38 energized, driving the cam system back to zero.

The delay in the operation is provided to allow the potentiometric system to come to balance and would normally be only 1 or 2 seconds; equally it may be replaced by a balance detector circuit coupled to an appropriate point in the servoamplifier circuit, and designed to operate when the servo signal to the motor has dropped to zero or a low value, of a magnitude associated with the effective balance point of the servosystem. The balance detector circuit has the advantage of being slightly quicker in action.

When the cam system has returned to zero, it closes the switch 48 as before, deenergizing the reset motor 38, energizing the magnetic clutch 36, and advancing the stepping switch 52 one step to being the device 56 of the next feeder into the circuit with the trip switch 20 associated with the next cam. The sequence is then repeated until all the ingredients in the recipe have been dispensed, when the stopping switch is advanced to a stop position, which allows the discharge of the completed recipe from the weighing container 6.

It will be noted from the foregoing that the control cams are set to zero after the addition of each ingredient, irrespective of the amount of the previous addition. Each ingredient set up is therefore the true weight desired for that ingredient, and providing no malfunctioning of the feeder occurs, this weight will be that which is added for the particular material.

Further should there be any error in the quantity of any ingredient admission, this will have absolutely no effect on any subsequent ingredients; equally the weight setting of any ingredient may be altered without affecting the weights selected for other ingredients.

The trip switches 20 used for each ingredient may also include an approach trip 58 actuated by the hump 46 before it reaches switch 42. This switch could be arranged to switch an impedance into the circuit of device 56 so that the shutter 54 can start to close before the desired weight of ingredient has been fed. Thus the trip 58 may provide an approach warning for each ingredient, so that, if desired the speed of operation of the feeder may be reduced, as the set point is approached. In addition an overweight alarm trip 60 may be provided set to operate at a predetermined excess weight over the set point. For example the trip 60 could be in an alarm bell circuit to indicate when an overweight is measured out when, because perhaps of inertia of the apparatus the cam did not stop rotating immediately, switch 42 was actuated point trip may be incorporated. The points at which these trips operate in relation to the set point may be separately adjustable for each ingredient. Thus the approach and alarm warnings may be adjusted to suit the particular ingredients and their rate of feed into the weighing container 6.

As described above the reset motor 38 is energized to reset the system. As an alternative however the motor may be left running continuously and the magnetic clutch 40 actuated.

In a modification of the apparatus described above the servomotor driven cams may be omitted and the system may incorporate a pulse-generating system wherein a series of pulses sent out by a pulse generator as the load in the feeder channel 4 builds up are fed to a pulse counter. In such an arrangement switches comparable to trip switch 42 can be arranged to be actuated when a predetermined number of pulses corresponding to the desired weight have been produced.

Clearly the measuring instruments in the installation referred to above, whether they be batch weighers or any other kind of weigher, may be remotely situated with respect to the actual weigher platform, connection being affected by means of a suitable electric cable.

I claim:

1. A weighing apparatus of the potentiometric balance type comprising a weighing container, one or more electrical transducers arranged beneath the container, a self-balancing potentiometer for measuring the output of the transducers, a servomotor driving the potentiometer shaft and energized by a difference signal produced by the transducers and the potentiometer and representative of the weight on the said container, control and indicating means driven by the said servomotor, means for disconnecting the indicating and control means from the servomotor, means for automatically returning the control and indicating means to zero after the said disconnection has taken place, the control and indicating means including a pulse generator driven by the servomotor, a pulse counter for counting a predetermined number of pulses corresponding to a desired weight, means activated when a desired number of pulses have been counted for automatically disconnecting the servomotor, and means for automatically returning the pulse counter to zero.

2. A weighing apparatus of the potentiometric balance type comprising a weighing container, one or more electrical transducers arranged beneath the container, a self-balancing potentiometer for measuring the output of the transducers comprising a servomotor driving said potentiometer shaft and energized by a difference signal produced by the transducers and the potentiometer, the position of the shaft being representative of the weight on the said container, control and indicating means driven by the said servomotor, means for disconnecting and reconnecting the control and indicating means from the self-balancing potentiometer, and means for automatically returning the control and indicating means to zero while the said disconnection has taken place.

3. A weighing apparatus of the potentiometric balance type having a weighing container, one or more electrical transducers arranged beneath the container, a self-balancing potentiometer for measuring the output of the transducers comprising a servomotor driving the potentiometer shaft and energized by a difference signal produced by the transducers and the potentiometer, the position of the shaft being representative of the weight on the said container, control and indicating means driven by the said servomotor, means for disconnecting the control and indicating means from the servomotor, and means for automatically returning the control and indicating means to zero after the said disconnection has taken place, the said control means comprising:
  I. a cam rotated by the servomotor in accordance with the weight signal applied to it,
  II. a trip switch associated with the cam,
  III. means for adjusting the location of the switch relatively to the cam so as to be actuated only when a selected weight has been applied to the weigher,
  IV. means whereby on actuation of the switch the means whereby the cam and the indicating and control means are disconnected from the potentiometer are operated so as to disconnect, and
  V. means whereby when the said disconnection has taken place the cam and indicating and control means are returned to a zero position.

4. A weighing apparatus according to claim 3 comprising a plurality of feeders feeding to the weighing container each of which feeders has an electrically controlled element, a cam and trip switch corresponding to each said feeder, each switch being in an electrical circuit with the controlled element of the corresponding feeder, a stopping switch, and means whereby when all the cams are returned to the zero position the stopping switch moves on one position so as to bring the trip switch and cam of the next successive feeder into operation.